US006703574B1

(12) United States Patent
Kechel et al.

(10) Patent No.: US 6,703,574 B1
(45) Date of Patent: Mar. 9, 2004

(54) PROCESS FOR SORTING DISTRIBUTION SEQUENCES

(75) Inventors: Ottmar Kechel, Stockach (DE); Reinhard Jirsa, Constance (DE); Hermann Pretzel, Constance (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/202,903

(22) PCT Filed: May 24, 1997

(86) PCT No.: PCT/EP97/02668

§ 371 (c)(1), (2), (4) Date: Oct. 1, 1999

(87) PCT Pub. No.: WO97/49502

PCT Pub. Date: Dec. 31, 1997

(30) Foreign Application Priority Data

Jun. 22, 1996 (DE) ........................................ 196 25 007

(51) Int. Cl.[7] ............................ G06K 9/00; G07C 5/00

(52) U.S. Cl. ....................... 209/584; 209/900; 700/215; 700/225; 700/223

(58) Field of Search ................................ 209/584, 900; 700/215, 219, 220, 223, 221, 225, 226, 227

(56) References Cited

U.S. PATENT DOCUMENTS 5,363,971 A 11/1994 Weeks et al.
6,279,750 B1 * 8/2001 Lohmann .................... 209/559
6,365,862 B1 * 4/2002 Miller et al. ................ 209/584
6,501,041 B1 * 12/2002 Burns et al. ................ 209/584

FOREIGN PATENT DOCUMENTS

EP 0 533 536 B1 3/1996 ............. B07C/3/00
EP 0 718 049 A2 6/1996 ............. B07C/3/06

* cited by examiner

*Primary Examiner*—Donald P. Walsh
*Assistant Examiner*—Jonathan R. Miller
(74) *Attorney, Agent, or Firm*—Jacob Eisenberg Siemens Schweiz

(57) ABSTRACT

The invention relates to a process for sorting distribution sequences on a despatch sorting machine, in which each despatch is arranged in a distribution sequence according to its read and recognized address code, where sorting takes place in several cycles in accordance with the number and size of the available sorting compartments and the sequence requirements. According to the invention, in order to avoid being faced with full compartments, after the recognition of all the despatches' address codes, with one or more full compartments, one or more compartment combinations for one distribution stop are found by iterative search steps taking account of all the compartments available for sorting and all possible distribution stops, while retaining the predetermined despatch sequence, where said combinations are formed by characteristic numbers of the compartments during the passages and which are capable of accepting despatches for distribution at the distribution stop concerned.

2 Claims, 5 Drawing Sheets c)

PROCESS FOR SORTING DISTRIBUTION SEQUENCES

BACKGROUND OF THE INVENTION

A process for a sorting distribution sequence is understood to refer to the process of arranging items to be distributed in a sequence, which corresponds to the sequence of the distribution stops, e.g., based on house numbers/mail boxes. The distributor systematically approaches or accesses these distribution stops in his delivery region. A distribution stop in this case is not an absolute sorting goal, but a relative position in the distribution sequence.

This sorting when done manually is very involved. With the aid of a sorting machine, this sorting can be performed with considerably less time expenditure, wherein the sorting is based on a sorting plan. This sorting plan is a directory for coordinating addresses with defined delivery stops, meaning a list describing the sequence. In the machine, it is the relation between a machine readable address code and the sequence number. Since the number of delivery stops is higher than the number of sorting compartments in the sorting machines, the sorting distribution sequence for the items to be sorted takes place during several sorting passes. For this, the items are supplied once more to the sorting machine, respectively in the same sequence in which they were sorted during the previous pass.

The following example is selected as explanation:

Number of distribution stops NDPNS: 800

Number of items to be sorted NMPCS: 3000

Number of sorting compartments in the sorting machine NSTCK: 12

Number of sorting passes NPASS: 3

Maximum number of letters for each compartment NFILL: 260

With 10 sorting compartments, it is possible to sort for a maximum of 999 distribution stops during 3 sorting passes. This is done by sorting during the first pass according to the ones digit, during the second pass according to the tens digit and during the third pass according to the hundreds digit.

The characteristic marking of the respective distribution stop DPN can therefore be used for a direct coordination with the sorting compartments, meaning for DPN=356, the sorting during the first pass is to compartment 6, during the second pass to compartment 5 and during the third pass to compartment 3.

Since the sorting machine comprises 12 sorting compartments, but only 10 compartments are needed for sorting during each pass, a situation where the compartment are full can be handled by assigning items to so-called overflow compartments. As soon as a sorting compartment is full, additional items for this compartment are redirected into an overflow compartment. When emptying the machines, a suitable operating guide ensures that the items from the original compartment and those from the associated overflow compartment are combined. If the number of sorting compartments that are filled exceeds the number of available overflow compartments, the sorting pass must be stopped, so that the operator can create space for additional items by emptying the respective compartment.

With this state of the art sorting process, sorting compartments can overflow or can be filled with only a very small number of items. Overflow compartments are made available because of the overflow possibility. However, this reserving of overflow compartments means a reduction in the sorting capacity of the sorting machine with respect to the possible distribution stops.

A successive optimizing of the sorting plan can reduce the number of necessary overflow compartments, but cannot replace these because the composition and the scope of the items remain unknown. When emptying the sorting machine and combining the content of the sorting compartments and overflow compartments, operating errors can occur, which may change the sequence in some cases to such a degree that the sorting must be repeated.

On the other hand, the use of overflow compartments does not ensure that other situations with full compartments cannot occur.

U.S. Pat. No. 5,363,971 discloses a process for avoiding compartment overflows, wherein the zip codes are read and assigned the distribution stops. Following this a microprocessor modifies the assignment of the zip codes to the distribution stops in order to optimize the distribution of the items in the compartments. This is done by not using all possible distribution stops, but providing reserve stops. A special coordination of the zip codes with the distribution stops makes it possible to distribute the items in an optimum manner, so as to minimize the probability of compartment overflows. Following that, the remaining number of items only are sorted into the original combination of compartments, which results in an undesirable, uneven filling of the compartments.

Low filling levels of the sorting compartments result in time losses because the time expenditure for emptying a compartment with low filling level does not differ or only insignificantly from that for emptying a full compartment.

It is the object of the invention to create a process for sorting distribution sequences in an item sorting machine, which process prevents the occurrence of full compartments while, at the same time, distributing the items as uniformly as possible into the compartments, so as to avoid additional overflow compartments and which makes it possible to use only enough sorting compartments as are needed for the actual number of items and the item composition in order to ensure an optimum filling of the compartments.

SUMMARY OF THE INVENTION

The above object given by is achieved according to the invention and a process for sorting distribution sequences in an item sorting machine, for which each item is arranged in a distribution sequence in accordance with its read and identified address code, wherein the sorting occurs during several passes in dependence on the number and size of the existing sorting compartments, as well as the number of the distribution stops describing the distribution sequence, and wherein: that following knowledge of the complete address coding for all items and to avoid full-compartment situations, using iterative search steps in a simulation of the sorting process prior to the sorting process that is carried out in the item sorting machine with up to n modified distribution stops, wherein n represents the total number of distribution stops that can be processed by the item sorting machine, which are formed during the passes as compartment combinations from the combinations of the characteristic numbers of all available sorting compartments, the items of each original distribution stop are distributed to modified distribution stops or compartment combinations while retaining the predetermined distribution sequence in such a way that the sorting compartments can accommodate the items arriving for distribution without exceeding the filling level, so that following the simulation, the sorting can occur in the item sorting machine. The assumption here is that the sorting capacity of the sorting machine as a rule is higher than the necessary capacity based on the item composition, thereby resulting in sorting compartments or sorting goals remaining unused.

As a result of the process according to the invention, these unused sorting goals/distribution stops are incorporated into the sorting process, starting with the fact that the sorting goals/distribution stops characterize only the relative position in the sorting sequence. For this, the original distribution stops are changed to modified distribution stops, meaning the same specified sequence for two different number systems. The process results in an automatic adaptation to the actual conditions of a sorting pass with respect to the number of items and the item composition with optimum use of the machine capacity.

The following advantages result:

Reduction in the operating time for the machine by preventing machine stops, caused by situations where the compartments are full;

Reduction in the number of operating errors, which can occur when emptying the sorting machine when combining the contents of sorting compartments and overflow compartments.

The advantageous embodiment according to patent claim 2 demonstrates that if the compartments are filled insufficiently, the number of compartments used are reduced until the predetermined optimum degree of filling is reached. This reduces the expenditure for emptying the machine since the actually needed number of compartments only are used.

The invention is explained in the following with further detail and with the aid of the drawings, wherein:

DESCRIPTION OF THE PREFERRED EMBODIMENTS

Figure 1:
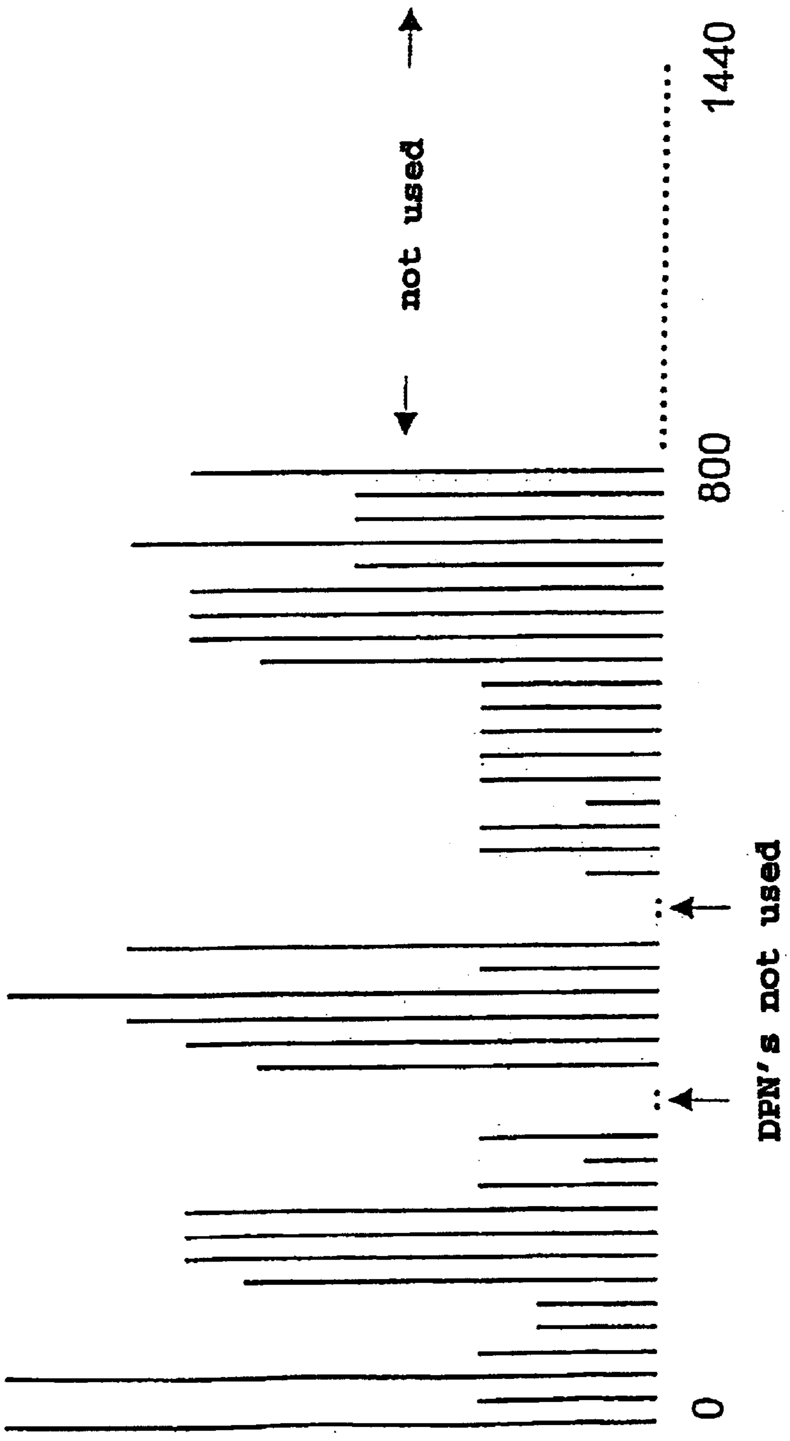
FIG. 1 Shows the distribution of the items following the $1^{st}$ sorting pass, during which the address code was determined, in accordance with the example specified in the introduction to the specifications.

Following the first sorting pass, the machine knows the address on each item. This is shown with an example in FIG. 1. As a result, the filling level of each sorting compartment during each successive sorting pass can also be predicted. If, in contrast to this example, the item to be shipped was read or presorted in another machine, the address coding could be made available through suitable measures, such that the optimizing can already occur in the sorting pass 1.

Given the assumption that no overflow compartments are provided during the sorting passes 2 and 3, the following value results for the number of possible distribution stops NDPNS:

$$NSTCK\ (pass\ 1) \times NSTCK\ (pass\ 2) \times NSTCK\ (pass\ 3) = 10 \times 12 \times 12 = 1440$$

Taking into account the original value range for the distribution stops between 0 and 799, at least 1440−800=640 possible sorting goals/distribution stops would remain unused. In order to make these distribution stops accessible to the sorting, the original distribution stops DPN are converted to modified distribution stops MDPN. The difference in the range of values DPN (0–799) according to MDPN (0–1439) can also be understood as expression of the same specified sequence in two different number systems. The following applies in that case:

NSTCK (number of sorting compartments) corresponds to the basis for the number system;

NPASS (number of sorting passes) corresponds to the number of digits used in the number system.

Figure 2:
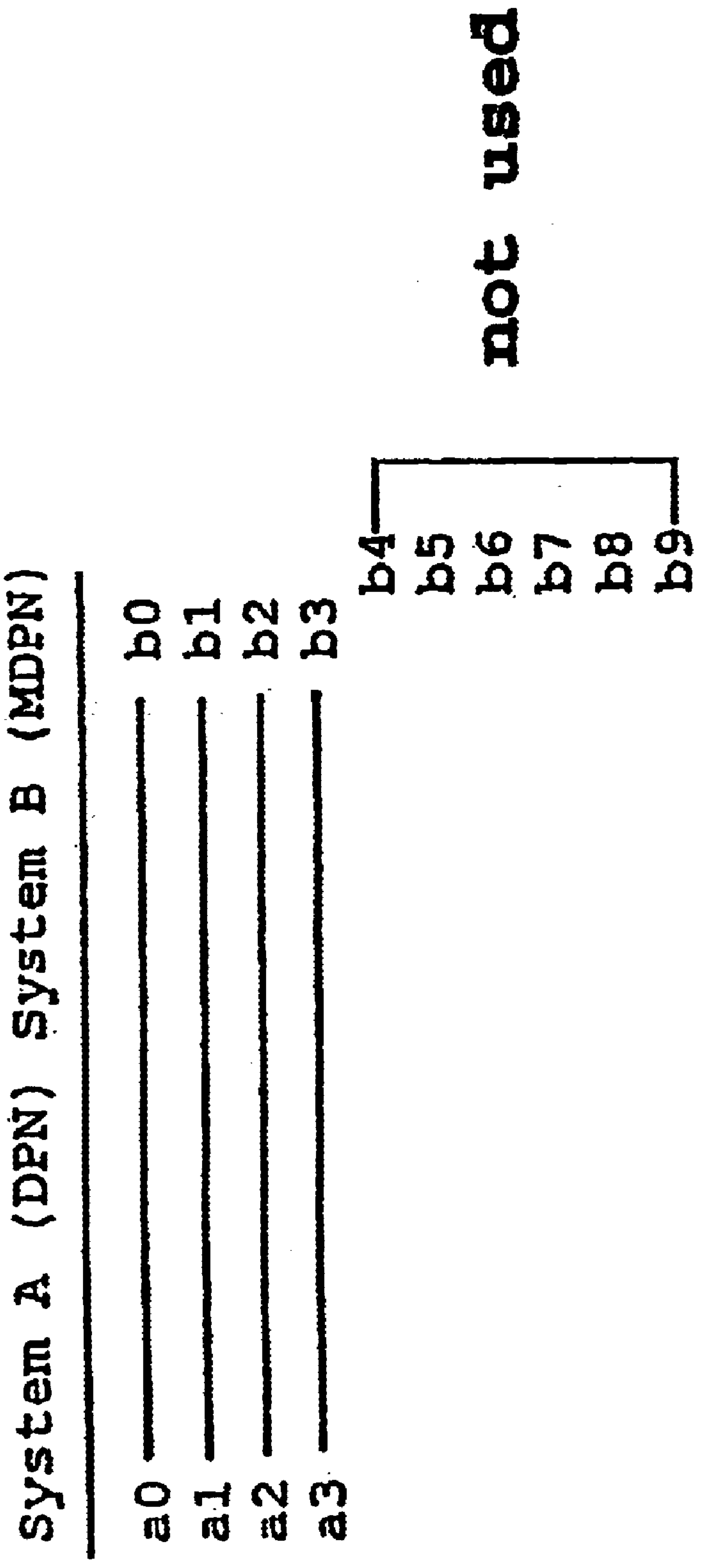
FIG. 2 Shows an illustration of the step-by-step changeover of the original distribution stops to modified distribution stops.
Figure 2:
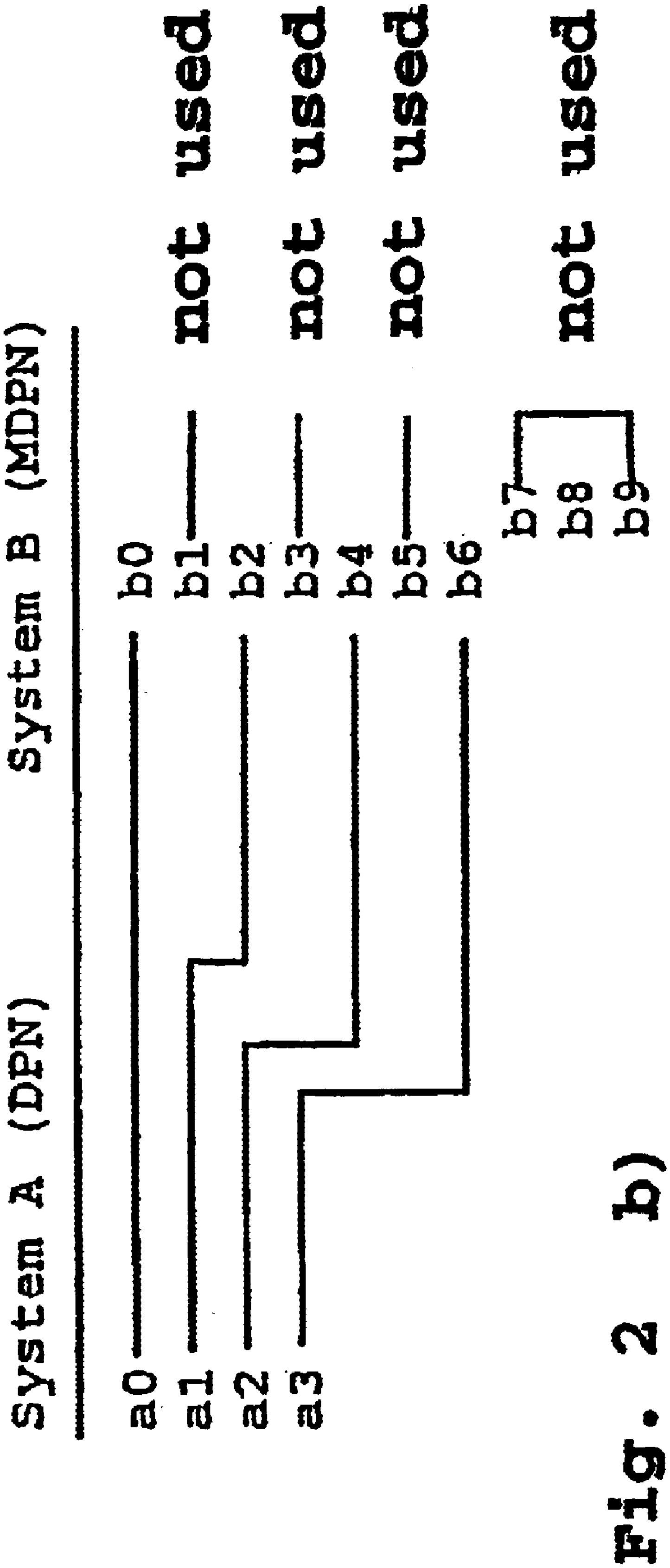
Figure 2:
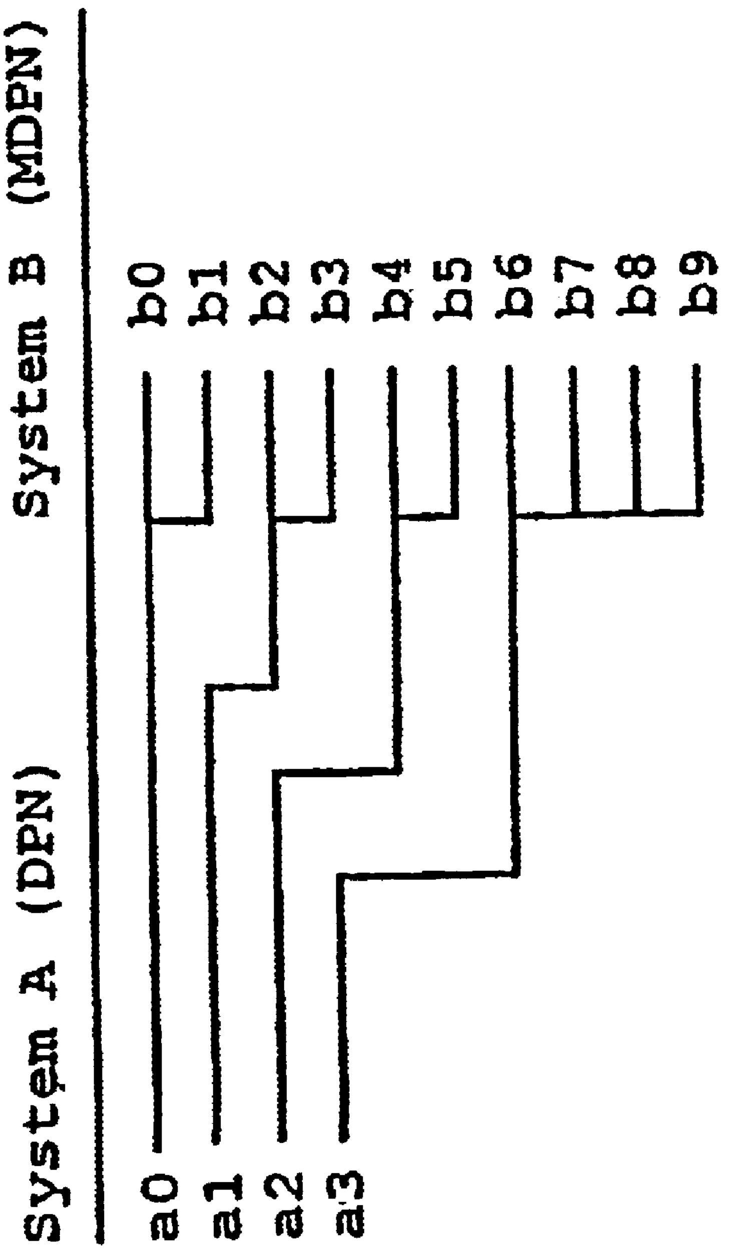

In FIG. 2, the changeover to the modified distribution stops is explained. It is obvious therein that nothing has changed in the distribution sequence. In this case, the direct coordination of elements from the number system A with the corresponding elements in the system B is shown in FIG. 2*a*). Elements from the system at the end of the observed range remain unused.

Figure 3:
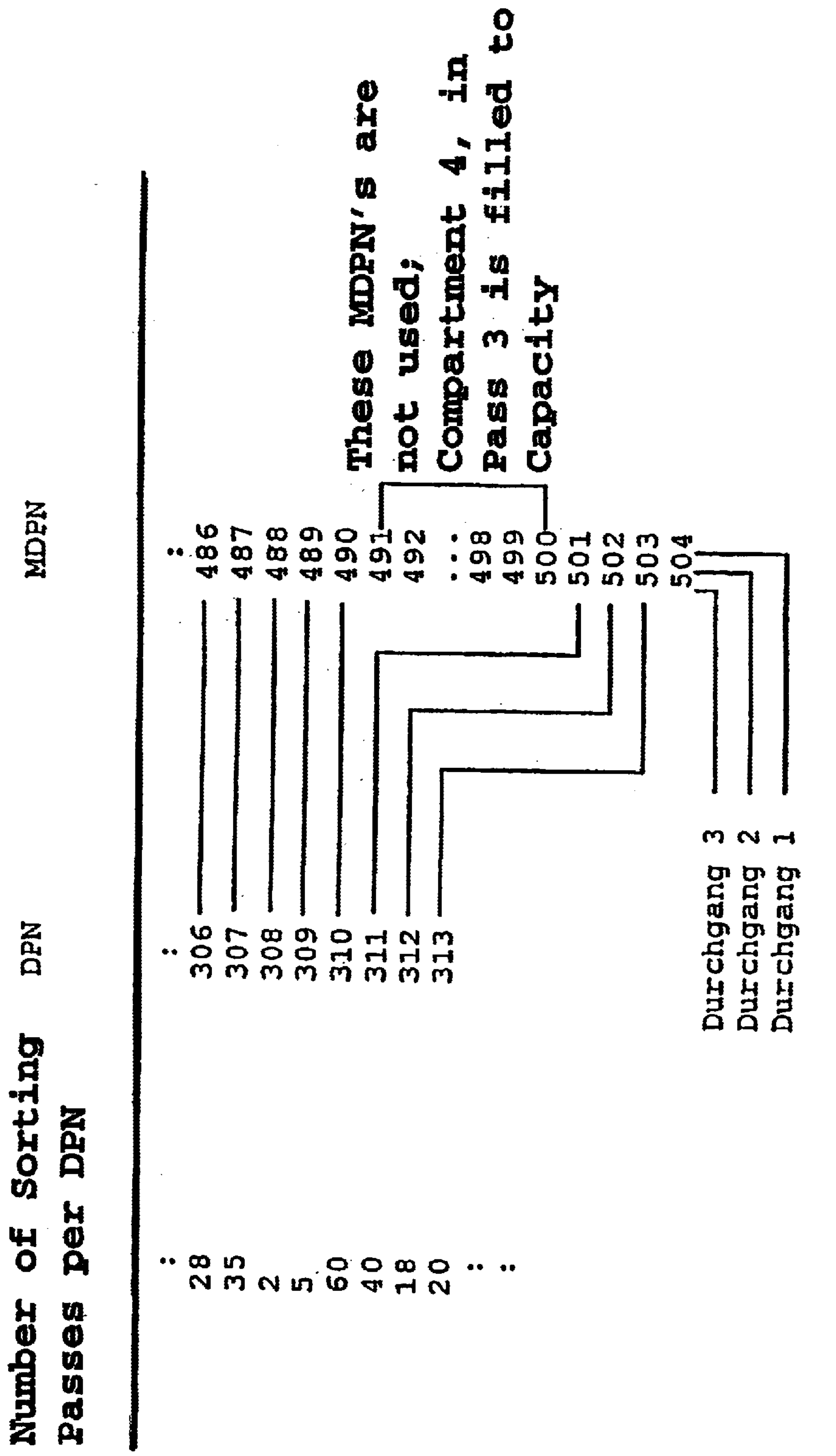
FIG. 3 Shows a section of the item distribution, with the distribution determined during pass 1 and the distribution with the modified distribution stops.

A modified coordination of the elements in system A with the elements in system B is shown in FIG. 2*b*), wherein the original distribution sequence is not distributed. The elements in system B remain unused in this case as well. FIG. 2*c*) illustrates the modification of the coordination of elements from the system A with the system B, given the assumption according to the invention that the contents of the elements can be divided. This is a given in that several items are assigned as a rule to a single distribution stop. The relevant order of the original system A, relative to the sequence, is preserved in this case as well. FIG. 3*c*) illustrates the modification of the coordination of elements from the system A with the system B, given the assumption according to the invention that the contents of the elements can be divided. This is a given in that several items are assigned as a rule to a single distribution stop. The relevant order of the original system A, relative to the sequence, is preserved in this case as well.

For the following sorting passes, the distribution to the sorting compartments of the machine is optimized according to the invention by using iterative search steps.

The following steps are taken for this:

1. Determination of starting values for limiting the iteration steps. Two formulations are used to determine the number of required sorting compartments nsp during the following (here 2) sorting passes (the address are read and recognized during the sorting pass 1):

a) $nsp = \sqrt[np]{ndpns}$ $np$ = number of optimized sorting passes $ndpns$ = number of still remaining DPN's in the optimized passes b) $nsp = \dfrac{nmpc}{limit}$ $nmpc$ = number of letters $limit$ = capacity of a sorting compartment The higher of the tow values is used as a starting value for the number of required sorting compartments. If the values are fractions, different numbers of sorting compartments may in some circumstances be selected for the remaining passes. Determination of the individual filling limit for the sorting compartments during the sorting pass i.

$$limit \cdot pi = \frac{nmpc}{nspi}$$

*nmpc*: number of letters

*limit*: number of sorting compartments in the sorting pass (pass) *i*.

2). A summation of the number of letters for each sorting compartment is performed during the distribution simulation, until the predetermined limit is reached. At that point, another, higher MDPN is searched for, which represents a sorting compartment combination that has not yet reached the limit. This is shown in sections in FIG. 3.

3). The step 2) is repeated for each specified or anticipated DPN, until either all DPNs are assigned to MDPNs, or the highest possible MDPN is reached.

4) Depending on the result in 3), the individual filling limit for the sorting compartments is lowered (all DPNs have a corresponding MDPN) or raised (the highest possible MDPN was reached).

5) With a step-by-step reduction of the interval from step 4), the steps 2) to 4) are repeated until the optimum result has been reached.

As further explanation, sorting passes without/with optimizing are contrasted for a 13-compartment machine and a 17-compartment machine. The following information is necessary to understand the statistics in this field:

Sorting compartment 1 is a special compartment for accommodating letters that cannot be processed with the machine and will not be sorted further; thus, only 12 and 16 sorting compartments remain.

2 overflow compartments—12/13 in the 13-compartment machine, 16/17 in the 17-compartment machine—are available for the first sorting pass.

Since this is a simulation and no actual feedback message of a full compartment situation has been received, the overflow compartments are not used during pass 1.

Material containing the same types of items was used for all 4 experiments.

| Sorting compartment report | pass 1 | pass 2 | pass 3 |
|---|---|---|---|
| 13-compartment machine | | | |
| sorting compartment 1: | 207 | 0 | 0 |
| sorting compartment 2: | 425 | 177 | 0 |
| sorting compartment 3: | 263 | 185 | 0 |
| sorting compartment 4: | 372 | 198 | 0 |
| sorting compartment 5: | 239 | 222 | 0 |
| sorting compartment 6: | 253 | 223 | 245 |
| sorting compartment 7: | 258 | 222 | 340 |
| sorting compartment 8: | 256 | 215 | 331 |
| sorting compartment 9: | 248 | 211 | 333 |
| sorting compartment 10: | 237 | 510 | 337 |
| sorting compartment 11 | 242 | 216 | 290 |
| sorting compartment 12: | 0 | 206 | 274 |
| sorting compartment 13: | 0 | 208 | 643 |
| 13-compartment machine; optimized | | | |
| sorting compartment 1: | 207 | 0 | 0 |
| sorting compartment 2: | 425 | 257 | 257 |
| sorting compartment 3: | 263 | 257 | 257 |
| sorting compartment 4: | 372 | 257 | 257 |
| sorting compartment 5: | 239 | 257 | 257 |
| sorting compartment 6: | 253 | 257 | 257 |
| sorting compartment 7: | 258 | 257 | 257 |
| sorting compartment 8: | 256 | 257 | 257 |
| sorting compartment 9: | 248 | 257 | 257 |
| sorting compartment 10: | 237 | 257 | 257 |
| sorting compartment 11 | 242 | 257 | 257 |
| sorting compartment 12: | 0 | 127 | 162 |
| sorting compartment 13: | 0 | 96 | 64 |
| 17-compartment machine | | | |
| sorting compartment 1: | 207 | 0 | 0 |
| sorting compartment 2: | 176 | 154 | 0 |
| sorting compartment 3: | 182 | 159 | 0 |
| sorting compartment 4: | 335 | 159 | 0 |
| sorting compartment 5: | 178 | 148 | 0 |
| sorting compartment 6: | 309 | 149 | 0 |

-continued

| Sorting compartment report | pass 1 | pass 2 | pass 3 |
|---|---|---|---|
| sorting compartment 7: | 180 | 143 | 0 |
| sorting compartment 8: | 182 | 142 | 0 |
| sorting compartment 9: | 176 | 144 | 0 |
| sorting compartment 10: | 181 | 154 | 0 |
| sorting compartment 11 | 177 | 156 | 0 |
| sorting compartment 12: | 179 | 150 | 0 |
| sorting compartment 13: | 179 | 153 | 90 |
| sorting compartment 14: | 181 | 147 | 627 |
| sorting compartment 15: | 178 | 454 | 620 |
| sorting compartment 16: | 0 | 192 | 571 |
| sorting compartment 17: | 0 | 189 | 885 |
| 17-compartment machine; optimized | | | |
| sorting compartment 1: | 207 | 0 | 0 |
| sorting compartment 2: | 176 | 229 | 229 |
| sorting compartment 3: | 182 | 229 | 229 |
| sorting compartment 4: | 335 | 229 | 229 |
| sorting compartment 5: | 178 | 229 | 229 |
| sorting compartment 6: | 309 | 229 | 229 |
| sorting compartment 7: | 180 | 227 | 229 |
| sorting compartment 8: | 182 | 229 | 229 |
| sorting compartment 9: | 176 | 229 | 229 |
| sorting compartment 10: | 181 | 229 | 229 |
| sorting compartment 11 | 177 | 229 | 229 |
| sorting compartment 12: | 179 | 229 | 229 |
| sorting compartment 13: | 179 | 209 | 229 |
| sorting compartment 14: | 181 | 65 | 45 |
| sorting compartment 15: | 178 | 0 | 0 |
| sorting compartment 16: | 0 | 0 | 0 |
| sorting compartment 17: | 0 | 0 | 0 |
| 17-compartment machine with reduced filling level | | | |
| sorting compartment 1: | 207 | 0 | 0 |
| sorting compartment 2: | 176 | 186 | 186 |
| sorting compartment 3: | 182 | 186 | 186 |
| sorting compartment 4: | 335 | 186 | 186 |
| sorting compartment 5: | 178 | 186 | 186 |
| sorting compartment 6: | 309 | 186 | 186 |
| sorting compartment 7: | 180 | 186 | 186 |
| sorting compartment 8: | 182 | 186 | 186 |
| sorting compartment 9: | 176 | 186 | 186 |
| sorting compartment 10: | 181 | 186 | 186 |
| sorting compartment 11 | 177 | 186 | 186 |
| sorting compartment 12: | 179 | 186 | 186 |
| sorting compartment 13: | 179 | 186 | 186 |
| sorting compartment 14: | 181 | 186 | 186 |
| sorting compartment 15: | 178 | 186 | 186 |
| sorting compartment 16: | 0 | 141 | 144 |
| sorting compartment 17: | 0 | 48 | 45 |

What is claimed is:

1. A process for sorting distribution sequences in an item sorting machine, whereby each item is arranged in a distribution sequence in accordance with its read and identified address coding, wherein the sorting takes place during several passes in dependence on the number and size of the existing sorting compartments, as well as the number of distribution stops describing the sequence requirement, characterized in that following knowledge of the complete address coding for all items and in order to avoid full-compartment situations, using iterative search steps in a simulation of the sorting process prior to the sorting process, carried out in the sorting machine with up to n modified distribution stops, wherein n represents the total number of distribution stops processed by the item sorting machine, which are formed as compartment combinations from combinations of the characterizing numbers for all available sorting compartments during the passes, the items of each original distribution stop are distributed to modified distribution stops and compartment combinations while retaining the predetermined distribution sequence, in such a way that the sorting compartments can accommodate the items arriving for distribution without exceeding the filling level, so that following the simulation, the sorting can occur in the item sorting machine.

2. A process for sorting distribution sequences according to claim 1, characterized in that starting with the actual number of items and the number of actually occupied distribution stops, a reduction in the number of compartments used for the distribution occurs until a predetermined, optimum filling level is reached.

* * * * *